C. W. REINOEHL & B. L. WEAVER.
NUT LOCK.
APPLICATION FILED SEPT. 3, 1909.
946,154.
Patented Jan. 11, 1910.
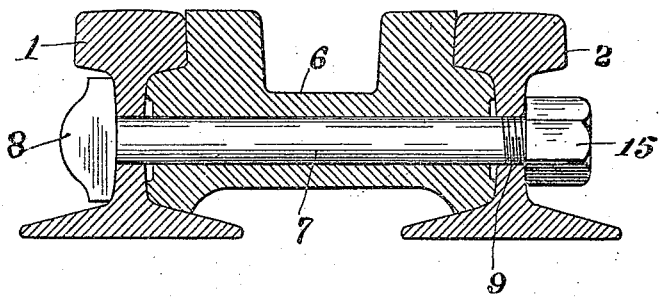
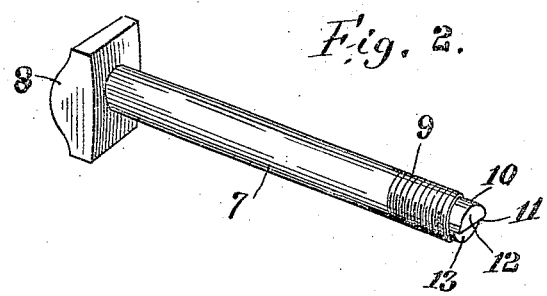
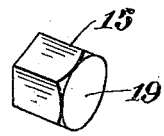
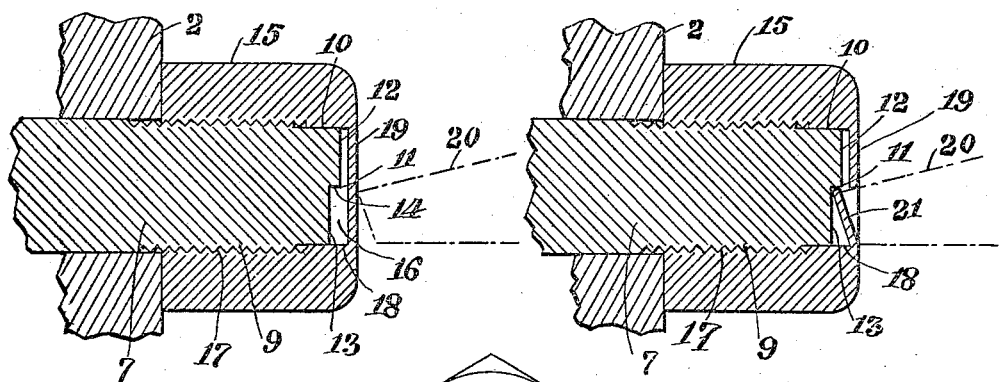
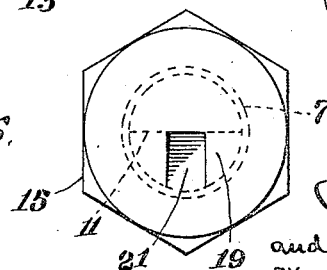
WITNESSES
E. M. Ware
K. Patton
INVENTORS
Charles W. Reinoehl
and Bert L. Weaver
BY
A. V. Groupe
ATTORNEY

UNITED STATES PATENT OFFICE.

CHARLES W. REINOEHL AND BENT L. WEAVER, OF STEELTON, PENNSYLVANIA.

NUT-LOCK.

946,154. Specification of Letters Patent. Patented Jan. 11, 1910.

Application filed September 3, 1909. Serial No. 516,114.

*To all whom it may concern:*

Be it known that we, CHARLES W. REINOEHL and BENT L. WEAVER, citizens of the United States, residing at Steelton, in the county of Dauphin and State of Pennsylvania, have invented certain new and useful Improvements in Nut-Locks, of which the following is a specification.

The object of our invention is to provide a bolt of novel construction, in combination with a nut of novel construction, having provision whereby the nut may be locked in place upon the bolt to prevent its accidental removal therefrom.

To this end the invention consists in the novel construction and combinations of parts which will be hereinafter fully described and claimed.

In the drawing:—Figure 1 is a transverse vertical section through a portion of a railroad structure provided with a securing bolt and nut embodying our invention. Fig. 2 is a perspective view of the bolt shown in Fig. 1. Fig. 3 is a similar view of the nut shown in Fig. 1. Fig. 4 is an enlarged vertical section of one end of our improved bolt having the nut applied thereto, and a portion of the structure shown in Fig. 1, showing the parts in position ready to be locked in place, and showing also, by dot-and-dash lines, the end of a suitable tool by means of which the parts may be set in locking position. Fig. 5 is a view similar to Fig. 4, showing the condition of the parts after the same have been set in locking position. Fig. 6 is an end view of the bolt and nut in the condition shown in Fig. 5.

Although it will of course be understood that our invention may be used in any suitable connection, in the present instance, for purposes of illustration, we have shown said invention applied to an ordinary railroad structure, in which 1 and 2 designate respectively two rails of well known type, and 6 an insert piece interposed between the rails 1 and 2. Extending through said insert piece 6 and the webs of the rails 1 and 2 is a securing bolt 7.

We do not limit ourselves to the precise form of bolt shown in the drawings, as the general character thereof is immaterial, and the construction of the bolt may be varied to suit different requirements in various applications. In the present embodiment of our invention, however, the bolt 7 is of the following construction. One end of the bolt is provided with an integral head 8 adapted to take against the outer side of the web of the rail 1, the vertical dimensions of the bolt head 8 being sufficient to prevent said head from turning in the space between the head and base of the rail 1. The opposite end of the bolt 7 extends through and beyond the web of the rail 2, and said end portion is provided with screw-threads 9 terminating a short distance inwardly of the end of the bolt, as shown in the drawings. The end portion of the bolt, adjacent and outwardly of the screw-threads 9, is reduced, as at 10, to a diameter less than the diameter of the main body of the bolt, and the end wall of the reduced portion 10 of the bolt is offset in a manner to form a shoulder 11 extending transversely of the bolt, as shown. By the formation of this shoulder 11 it will be seen that the end of the bolt is provided with outer and inner parallel faces, 12 and 13 respectively, arranged in different vertical planes and connected by a horizontal wall 14 extending transversely of the bolt 7. Screwed on to the screw-threaded portion 10 of the bolt is the nut 15, which, in the present embodiment of our invention is of the following construction.

15 designates a hexagonal body portion provided with a centrally-arranged longitudinal bore or opening 16, the wall of which is internally screw-threaded as at 17, and fitted to the threaded portion of the bolt. The opening 16 is provided at one end thereof adjacent the screw-threads 17, with a reduced portion 18, of such length and diameter that it will receive and fit the reduced end portion 10 of the bolt 7 when the nut 15 is screwed up into locking position.

In the normal condition of the nut—that is to say, before the locking operation takes place—the outer end of the bolt-receiving opening 16 is entirely covered or closed by a web or locking portion 19 extending over said opening and formed integral with the body of the nut 15. The outer face of this web 19 is arranged in the same vertical plane with and forms in effect a continuation of the outer face of the body portion of the nut.

In assembling the parts, the bolt 7 is passed through the alined openings in the web of the rail 1, the insert piece 6 and the web of the rail 2, with the bolt head 8 in engagement with the outer side of the rail 1 and the opposite end of the bolt projecting outwardly beyond the web of the rail 2. The nut 15 is then screwed on to the threaded end of the bolt, into close engagement with the rail, thereby tightening the bolt 7 and drawing the parts of the structure firmly together into the position shown in Fig. 4. Thereupon, by means of any suitable tool (such as the punch 20 indicated by dot-and-dash lines in Figs. 4 and 5), a portion 21 of the web 19 is punched inwardly into engagement with the shoulder 11. In this position of the parts the nut is firmly locked in place upon the bolt by the web portion 21 engaging the shoulder 11 and preventing accidental unscrewing of the nut.

It will be observed that the web portion 21 punched into engagement with the shoulder 11 as shown in the drawings has its inner end and lateral portions cut from the main body of the web 19 due to the sharp edges of the tool or punch 20, and the distance of the shoulder 11 from the web 19. It is not essential, however, that the portion of the web 21 punched into engagement with the shoulder 11 to cut from the main body of the web, as the same may be bent or merely displaced from its normal position sufficiently to engage the shoulder 11 and prevent the unscrewing of the nut from the bolt.

When, for any reason, it is desirable to re-adjust the nut 15 upon the bolt by force after it has been locked thereon as previously described, the same may be relocked upon the bolt after it has been screwed thereon by punching another portion of the web 19 into engagement with the shoulder 11.

The web 19 of the nut, it will be observed, is sufficiently thin to enable it to be readily cut and bent by the tool 20; and the arrangement of the shoulder 11 and the outer and inner faces 12 and 13 respectively on the end of the bolt, is such as to permit a suitable portion of the web 19 to be readily forced into effectual locking position.

We claim:—

1. The combination of a bolt having a shoulder formed on one end thereof and having its adjacent end portion screw-threaded, and a nut having a bolt-receiving opening therein and screwed on to the screw-threaded end of the bolt and having a web extending transversely of the bolt over the outer portion of the opening in the nut, a part of said web being bent and extended into the opening in the nut and engaged with said shoulder.

2. The combination of a bolt having a shoulder formed on one end thereof and having its adjacent end portion screw-threaded, and a nut having a bolt-receiving opening therein and screwed on to the screw-threaded end of the bolt and having a web normally closing one end of the opening in the nut, a part of said web being bent and extended into the opening in the nut and engaged with said shoulder.

3. The combination of a bolt having an end portion reduced to a diameter less than the diameter of the main body of the bolt and having a shoulder formed thereon, the main body of the bolt adjacent the reduced end portion being screw-threaded, and a nut having a bolt-receiving opening therein fitted to the reduced end portion of the bolt and screwed on to the screw-threaded portion of the bolt, said nut having a web extending transversely of the bolt over the outer portion of the opening in the nut, and a part of said web being bent and extended into the opening in the nut and engaged with said shoulder.

4. The combination of a bolt having on one end thereof outer and inner faces arranged in parallel planes extending transversely of the bolt, and a wall connecting said faces and extending from one side of the bolt to the opposite side thereof and forming a shoulder, the end portion of said bolt adjacent said shoulder being screw-threaded, and a nut having a bolt-receiving opening therein and screwed on to the screw-threaded end of the bolt and having a web extending transversely of the bolt over the outer portion of the opening in the nut, a part of said web being bent and extended into the opening in the nut and engaged with said shoulder.

In testimony whereof we affix our signatures in presence of two witnesses.

CHARLES W. REINOEHL.
BENT L. WEAVER.

Witnesses:
E. M. WARE,
R. H. GAMBLE.